United States Patent [19]
Ozeki

[11] 4,343,106
[45] Aug. 10, 1982

[54] THIN-PIECE HOLDING STRUCTURE AND A SLIDE FILING SHEET USING THAT STRUCTURE

[75] Inventor: Jiro Ozeki, Tokyo, Japan
[73] Assignee: Slidex Corporation, Tokyo, Japan
[21] Appl. No.: 212,339
[22] Filed: Dec. 2, 1980
[30] Foreign Application Priority Data
  Jun. 2, 1980 [JP] Japan ................................. 55-72675
[51] Int. Cl.³ .......................... A47G 1/06; G09F 1/10; B42F 5/00
[52] U.S. Cl. ..................................... 40/158 B; 40/405
[58] Field of Search ................. 40/158 B, 158 A, 405, 40/158 R, 159

[56] References Cited
U.S. PATENT DOCUMENTS

| | | | |
|---|---|---|---|
| 1,474,174 | 11/1923 | Segall | 40/158 B |
| 1,544,139 | 6/1925 | Duclos | 40/158 B |
| 1,733,215 | 10/1929 | Barry | 40/158 B |
| 2,856,713 | 10/1958 | Mosca | 40/158 B |
| 3,279,112 | 10/1966 | Gould et al. | 40/158 R |
| 3,431,667 | 3/1969 | Woods | 40/158 B |

Primary Examiner—Gene Mancene
Assistant Examiner—Michael J. Foycik, Jr.
Attorney, Agent, or Firm—Fleit & Jacobson

[57] ABSTRACT

The disclosed structure holds a rectangular thin-piece such as a photographic transparency on a base sheet between at least two holding portions formed on the base sheet and a thin-piece seat being recessed relative to the holding portions. A push-in area is formed on the base sheet adjacent to both the seat and at least one of the holding portions. One edge of the thin-piece is once pushed in between the push-in area and the holding portion adjacent thereto to an extent sufficient for clearing the thin-piece from the remainder of the holding portions, and then the thin-piece is moved back from the push-in area onto the seat where an abutting member abuts the thin-piece to keep the thin-piece in position. A plurality of the thin-piece holding structures are formed on one base sheet to form a slide filing sheet.

11 Claims, 11 Drawing Figures

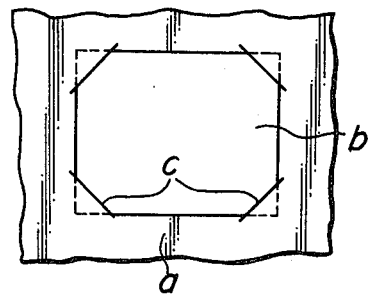
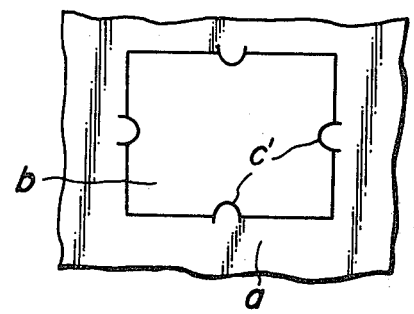
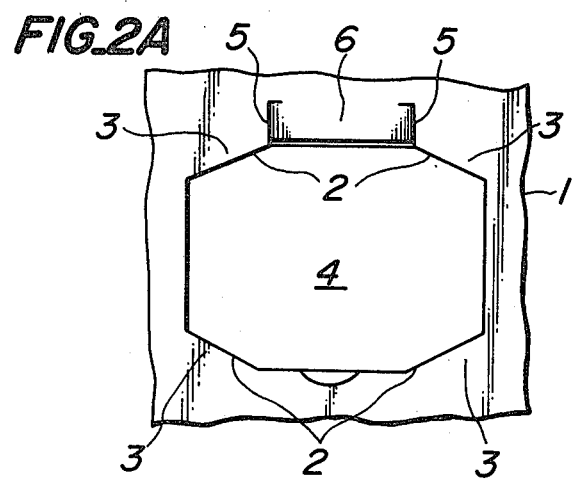
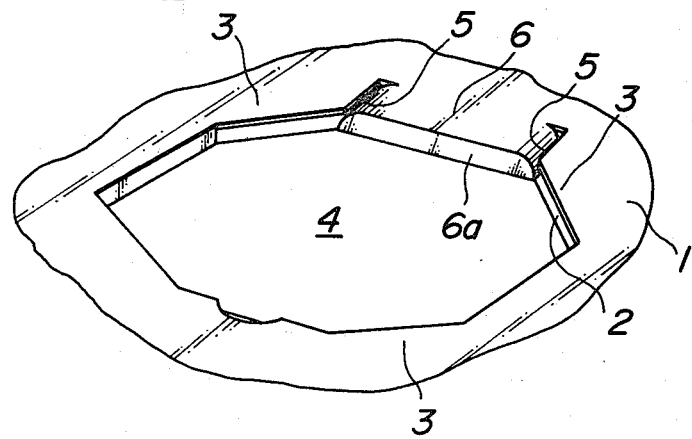

THIN-PIECE HOLDING STRUCTURE AND A SLIDE FILING SHEET USING THAT STRUCTURE

BACKGROUND OF THE INVENTION

1. Field of the Invention

This invention relates to a structure for holding a thin-piece such as a photographic transparency and a slide filing sheet using a plurality of the structures.

2. Description of the Prior Art

To hold rectangular thin-pieces, such as name cards, photographs, films, transparencies, and the like in an orderly fashion, it has been practiced to provide slits on a base sheet at those positions which correspond to four corners of each thin-piece, so that the four corners of the thin-piece are inserted into the corresponding slits. Whereby, the thin-piece can be held by the base sheet. If a large number of the slits are regularly disposed on the base sheet, such base sheet can hold the thin-pieces in an orderly fashion. The shape of the slits can be rectilinear or of U-shape. Such base sheet of the prior art has shortcoming in that, when a corner of the thin-piece is inserted into the corresponding slit, either the base sheet or the thin-piece must be slightly bent. Similar bending of the base sheet or the thin-piece is necessary to remove the thin-piece from the base sheet. The need of such bending is not desirable from the standpoint of the ease in handling the thin-piece and the base sheet.

SUMMARY OF THE INVENTION

Therefore, an object of the present invention is to obviate the aforementioned shortcoming of the prior art, by providing an improved structure to hold a thin-piece which structure ensures easy mounting of the thin-piece thereon and easy dismounting of the thin-piece therefrom. Another object of the invention is to provide a slide filing sheet using a plurality of the last mentioned structures to hold photographic transparencies in an orderly fashion.

To fulfill the object, a structure to hold a rectangular thin-piece according to the present invention comprises a base sheet, at least two holding portions formed on said base sheet, a thin-piece seat being recessed relative to the holding portions so as to receive said thin-piece between said holding portions and said seat, a push-in area formed on said base sheet adjacent to both said seat and at least one of said holding portions, and an abutting member formed on that part of said push-in area which is contiguous to said seat, the push-in area being so dimensioned that one edge of the thin-piece can be once pushed in between said push-in area and said holding portion adjacent thereto to an extent sufficient for clearing the thin-piece from the remainder of said holding portions, whereby said thin-piece can be moved back from said push-in area onto the seat where said abuts member abutts one edge of the thin-piece to keep the thin-piece in position.

The slide filing sheet according to the present invention uses a suitably sized base sheet, so that a plurality of the aforementioned structures to hold rectangular thin-pieces are regularly formed on the base sheet for instance in rows and columns.

A preferred embodiment of the slide filing sheet has the base sheet made of transparent material.

In another embodiment of the slide filing sheet according to the present invention, the base sheet is made of translucent or opaque material and each of the thin-piece seats has an opening at central portion thereof, said opening being substantially the same in size as a picture portion of each photographic transparency placed on said thin-piece seat.

BRIEF DESCRIPTION OF THE DRAWINGS

For a better understanding of the invention, reference is made to the accompanying drawings, in which:

FIGS. 1A and 1B are schematic plan views of two thin-piece holding structures of the prior art;

FIGS. 2A and 2B are a schematic plan view and a schematic perspective view of an embodiment of the present invention;

FIG. 2C is a view similar to FIG. 2A illustrating a thin-piece in the process of being inserted into the holding structure;

FIG. 4A is a view illustrating a thin-piece in the process of being inserted into the holding structure of FIG. 4.

Like parts are designated by like numerals and symbols throughout different views of the drawings.

DESCRIPTION OF THE PREFERRED EMBODIMENTS

Before entering the details of the present invention, the prior art will be briefly reviewed by referring to FIGS. 1A and 1B. A structure shown in FIG. 1A has a base sheet a with rectilinear slits c which are formed on those portions of the base sheet that correspond to corners of a thin-piece b to be held thereby. U-shaped slits c′ are also used in the structure of the prior art as shown in FIG. 1B, so as to hold corresponding edges of the thin-piece b. When corners or edges of the thin-piece b are inserted into the slits c or c′, the thin-piece is held in position by the slits c or c′. To insert the thin-piece b in the slits c or c′ of the structure of the prior art, it has been necessary to bend the thin-piece b or the slits c or c′. Similar bending has been necessary to remove the thin-piece b from the slits c or c′.

Figure 3A:
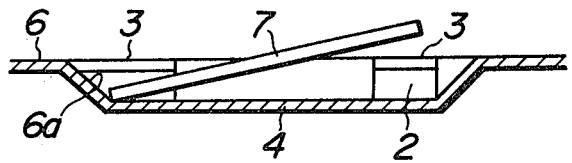
FIGS. 3A, 3B and 3C are schematic sectional views showing the manner in which a thin-piece is inserted in a thin-piece holding structure of the embodiment of FIGS. 2A and 2B.

Referring to FIGS. 2A and 2B showing a schematic plan view and a schematic perspective view of a thin-piece holding structure of the present invention, a base sheet 1 made of paper or plastics has four rectilinear slits 2 formed thereon to define four holding portions 3. The holding portions 3 are to overlie corners of a rectangular thin-piece (see FIG. 3A) when the thin-piece 7 is held in position by the structure.

A thin-piece seat 4 is formed for instance by recessing the base sheet 1 by an extent substantially equivalent to the thickness of the thin-piece 7, so that the spacing between opposing surfaces of the thin-piece seat 4 and the holding portions 3 is substantially the same as the thickness of the thin-piece 7.

The illustrated embodiment of the invention uses four holding portions 3, but the number of the holding portions 3 is not restricted to four in the invention. It is apparent that two holding portions to hold at least a pair of diagonally positioned corners of the thin-piece 7 are sufficient for holding the thin-piece 7 in position. The aforesaid spacing or level difference between the opposing surfaces of the thin-piece seat 4 and the holding portions 3 can be provided either by recessing the thin-piece seat 4 or by thrusting out the holding portions 3 relative to the level of the base sheet 1.

In the embodiment of FIGS. 2A and 2B, a pair of slits 5 extend from two adjacent slits 2 in a direction away from the thin-piece seat 4. The slits 5 define a push-in area 6 adjacent both to the thin-piece seat 4 and to the aforementioned two holding portions 3. That edge of the thin-piece seat 4 which is adjacent to the push-in portion 6 has an abutting member 6a to limit movement of the thin-piece 7. Although the abutting member 6a of the illustrated embodiment is an inclined wall, the abutting member 6a can be a boss or a projected ridge integrally formed with the push-in area 6. It is noted that the push-in area 6 can be formed on the same level as that of the thin-piece seat 4.

Figure 3B:
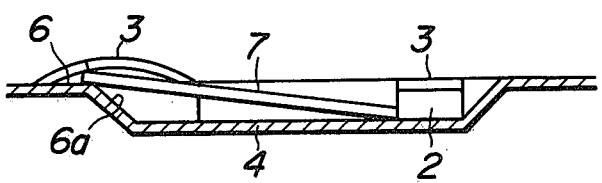

In the structure of FIGS. 2A and 2B, as best illustrated in FIG. 2C, the dimensions of the push-in portion 6 are such that the thin-piece 7 can be pushed in between the push-in area 6 and the holding portions 3 adjacent thereto to an extent sufficient for clearing the thin-piece 7 from the remaining ones of the holding portions 3. The remaining holding portions 3 are at that edge of the thin-piece seat 4 which is opposite to said push-in area 6. More particularly, referring to FIGS. 3A, 3B and 3C, two corners of the thin-piece 7 are inserted under the two holding portions 3 adjacent the push-in area 6, and the edge of the thin-piece 7 between the aforesaid two corners thus inserted under the holding portions 3 is pushed in across the abutting member 6a onto the push-in area 6 until the thus pushed in edge of the thin-piece 7 engages closed ends of the slits 5. When one edge of the thin-piece 7 engages the closed ends of the slits 5, the opposite edge of the thin-piece 7 is cleared from the remaining ones of the holding portions 3 and placed on the inside surface of the thin-piece seat 4, as specifically shown in FIG. 3B, because the dimensions of the push-in area 6 and the slits 5 are selected in the aforementioned manner.

Figure 3C:
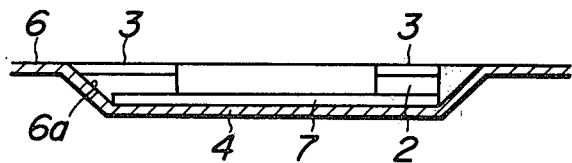

To place the thus pushed in thin-piece 7 in position on the thin-piece seat 4, the forward edge of the thin piece 7 pushed in the push-in area 6 is forced in the reverse direction, so as to move the opposite edge of the thin-piece 7 under the aforesaid remaining ones of the holding portions 3, as specifically shown in FIG. 3C.

Once the thin-piece 7 is placed in position on the thin-piece seat 4, the abutting member 6a effectively prevents the thin-piece 7 from being pushed in the direction of the aforementioned push-in of the thin-piece 7. Thus, the four corners of the thin-piece 7 are held between the thin-piece seat 4 and the holding portions 3, so that any vibration or impact during handling will never cause any separation or dropping of the thin-piece 7 from the holding space between the seat 4 and the holding portions 3.

Numerous modifications of the embodiment of FIGS. 2A, 2B, and 2C are possible. For instance, two or more push-in areas 6 may be provided on the periphery of the thin-piece seat 4, so as to increase the freedom in the direction of inserting the thin-piece 7 onto the seat 4. The two slits 5 formed as a pair on the base sheet 1 can be angled relative to the nearest edge of the thin-piece seat 4, or the spacing between the two slits 5 may increase or decrease as the slits 5 extend away from the thin-piece seat 4.

Figure 4:
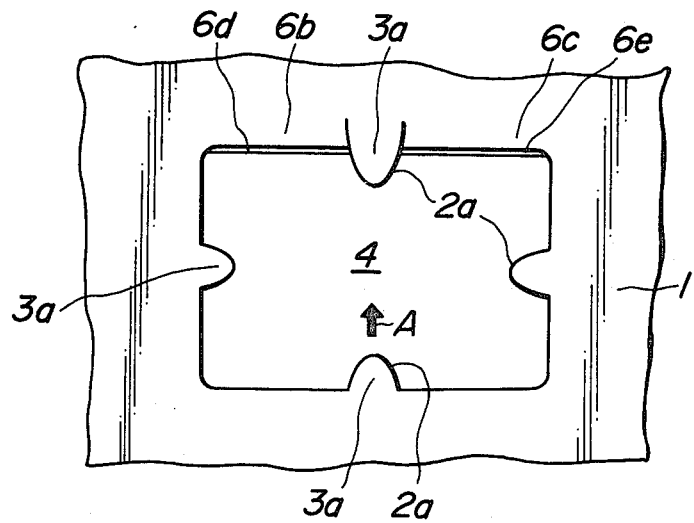
FIG. 4 is a schematic plan view of another embodiment of the present invention.

FIG. 4 shows a schematic plan view of another embodiment of the present invention. A base sheet 1 of this embodiment has U-shaped slits 2a formed at positions corresponding to edges of a thin-piece 7 to be held thereby, so as to define holding portions 3a by the U-shaped slits 2a. A thin-piece seat 4 is formed at a level spaced from the level of the holding portions 3a in the thickness direction of the base sheet 1. One of the U-shaped slits 2a is extended away from the thin-piece seat 4, so that two push-in areas 6b and 6c are formed adjacent both the holding portions 3a defined by the thus extended slit 2a and the thin-piece seat 4.

The push-in areas 6b and 6c of the embodiment of FIG. 4 have two abutting member 6d and 6e formed of inclined walls along one edge of the thin-piece seat 4. The dimensions of the push-in areas 6b and 6c which depend on the length of the aforementioned extension of the slit 2a are selected in the same manner as those of the push-in area 6 of the preceding embodiment of FIGS. 2A and 2B.

To place the thin-piece 7 in position on the thin-piece seat 4, the thin-piece 7 is at first pushed in the direction of the arrow A of FIGS. 4 and 4A, while keeping opposing side edges of the thin-piece 7 under the corresponding side holding portions 3a, so that the forward edge of the thin-piece 7 as seen in the direction of the arrow A passes the abutting members 6d and 6e and enters between the corresponding holding portion 3a and the push-in portions 6b and 6c until the forward edge engages or comes close to engagement with the closed ends of the slit 2a farthest from the thin-piece seat 4. Then, the thin-piece 7 is forced in a direction opposite to the arrow A, so that the rear edge of the edge opposite to the forward edge of the thin piece 7 becomes into the space between the thin-piece seat 4 and that holding portion 3a located opposite to the push-in areas 6b and 6c.

When the thin-piece 7 is placed in position on the thin-piece seat 4 in the aforesaid manner, the thin-piece 7 is effectively prevented from separation or dropping from the holding portions 3a as in the case of the preceding embodiment of FIGS. 2A and 2B.

Removal of the thin-piece 7 from the holding portions 3a can be very easily effected, by carrying out the aforementioned placing operations in reversed sequence.

Although two push-in areas 6b and 6c are formed on opposite sides of the extended holding portion 3a in the case of the emboidment of FIG. 4, it is also possible to form a push-in area on the rear side of the holding portion 3a at a position adjacent to but outside of a seating part of the holding portion 3a.

With the thin-piece holding structure described in the foregoing, a thin-piece can be easily and reliably placed at a holding position of the structure without any risk of separation or dropping therefrom, simply by pushing the thin-piece into the push-in area without bending either the thin-piece or the base sheet and forcing back the thin-piece until the rear edge of the thin-piece as seen in the push-in direction comes under the corresponding holding portion or portions. The removal of the thin-piece from the thin-piece holding structure is also easy.

Figure 5:
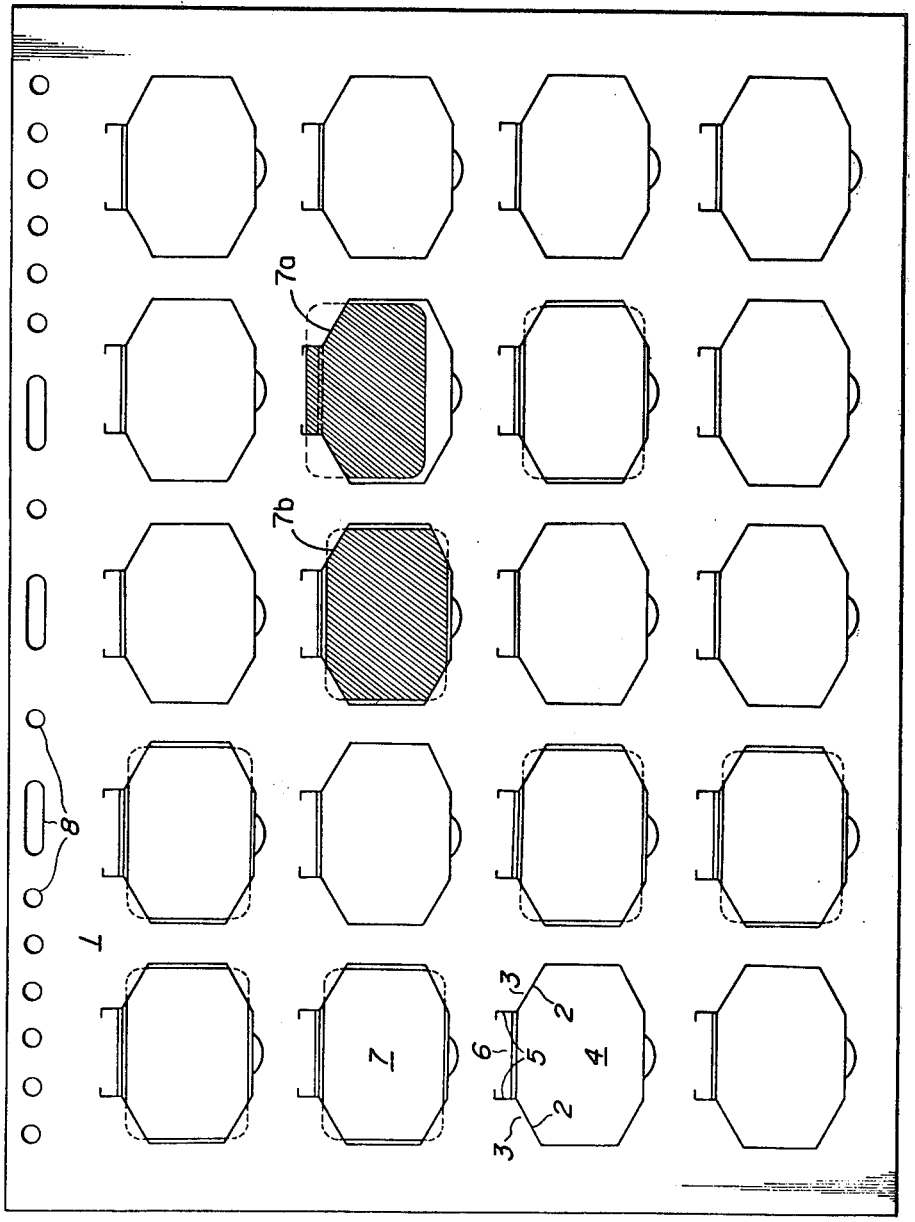
FIG. 5 is a schematic plan view of a slide filing sheet using a plurality of the thin-sheet holding structures of FIGS. 2A and 2B.

FIG. 5 is a schematic plan view of a slide filing sheet using a plurality of the aforementioned structures to hold thin-pieces. In the figure, a base sheet 1 has a plurality of the thin-piece holding structures of FIGS. 2A and 2B formed in rows and columns thereon. In the second row, a first thin-piece 7a is illustrated in the position the thin-piece occupies after it has been initially inserted into the slide filing sheet. A second thin-piece 7b is illustrated in the normal mounting position.

A plurality of filing holes 8 are bored through the base sheet 1 along one edge thereof, so that the slide filing sheet can be filed in an album fashion by fitting the filing holes 8 in suitable metallic filing means. The filing holes 8 can be also used for hanging or indexing the slide filing sheet in cooperation with suitable hanging or indexing means.

The slide filing sheet of the aforementioned structure is not bulky, and photographic transparencies with or without mounting frames can be easily and properly placed on and held by the slide filing sheet. The interspaces between the adjacent thin-piece holding structures can be used for writing down short notes by suitably treating the surfaces of such interspaces.

To project the picture of a transparency held by the slide filing sheet of FIG. 5, for instance by directly mounting the slide filing sheet with one or more transparencies on an overhead type projector, the base sheet 1 of the slide filing sheet should preferably be made of suitable transparent material. In this case, if light beams from a projecting lens of the projector illuminate outside the picture area of the photographic transparency and disturb the appreciation of the picture by causing bright areas around the projected image of the picture on a screen, it is preferable to use a slide filing sheet having the base sheet 1 made of suitable opaque or translucent material with an opening formed at the central portion of each thin-piece seat 4, the opening being so sized as to match the picture portion of the transparency.

Although the illustrated slide filing sheet uses the thin-piece holding structures as shown in FIGS. 2A and 2B, the thin-piece holding structures of FIG. 4 can be also used in forming a slide filing sheet according to the invention.

As described in the foregoing, with the thin-piece holding structure according to the present invention, it is not necessary at all to bend any of the thin-piece and the base sheet in order to place or remove the thin-piece relative to the thin-piece holding structure, so that the operation is considerably simplified as compared with that of the prior art. Besides, the thin-piece once held by the thin-piece holding structure of the invention is prevented from separation or dropping therefrom without failure by the abutting member. Whereby, loss of the thin-piece is substantially eliminated by using the structure of the invention.

Furthermore, with the slide filing sheet using the aforementioned thin-piece holding structures of the invention, the thickness or the volume of the slide filing sheet is reduced, and photographic films and transparencies can be easily placed on and held by the slide filing sheet in an orderly manner regardless of whether mounting frames are provided or not.

Although the invention has been described with a certain degree of particularity, it is understood that the present disclosure has been made only by way of example and that numerous changes in details of construction and the combination and arrangement of parts may be resorted to without departing from the scope of the invention as hereinafter claimed.

What is claimed is:

1. A structure to hold a rectangular thin-piece in an aperture comprising a base sheet, at least two holding portions formed on said base sheet at opposite sides of the aperture, a thin-piece seat covering at least a portion of the aperture and being recessed relative to the holding portions so as to receive said thin-piece between said holding portions and said seat, said holding portions being defined by slits separating said holding portions from said thin-piece seat, a push-in area formed on said base sheet and having a portion thereof contiguous to said seat, said push-in area being defined by slits extending from the aperture that are adjacent to both said seat and at least one of said holding portions, and an abutting member formed on that part of said push-in area which is contiguous to said seat, said push-in area being so dimensioned that one edge of the thin-piece is adapted to be once pushed in between said push-in area and said holding portion adjacent thereto to an extent sufficient for clearing the thin-piece from said holding portion located at the opposite side of the aperture, wherein said thin-piece is movable back from said push-in area onto the seat where said abutting member abuts one edge of the thin-piece to keep the thin-piece in position.

2. A structure as set forth in claim 1, wherein said holding portions are defined by rectilinear slits formed on said base sheet.

3. A structure as set forth in claim 1, wherein said holding portions are defined by U-shaped slits formed on said base sheet.

4. A structure as set forth in claim 1, wherein said aperture has a generally rectangular shape and a holding portion is defined at each corner of said aperture.

5. A structure as set forth in claim 1, wherein said aperture has a generally rectangular shape and a holding portion is defined on each side of said aperture.

6. A slide filing sheet having a plurality of apertures comprising a base sheet and a plurality of thin-piece holding structures formed on said base sheet for holding thin pieces in said apertures, said apertures and holding structures being arranged in lateral and longitudinal directions; each of said thin-piece holding structures consisting of at least two holding portions formed on said base sheet at the opposite sides of a respective aperture, a thin-piece seat being recessed relative to the holding portions and covering at least a portion of the aperture so as to receive said thin piece between said holding portions and said seat, said holding portions being defined by slits cut between said holding portions and said thin-piece seat, a push-in area formed on said base sheet and having a portion thereof contiguous to said seat, said push-in area being defined by slits extending from the aperture that are adjacent to both said seat and at least one of said holding portions, and an abutting member formed on that part of said push-in area which is contiguous to said seat, said push-in area being so dimensioned that one edge of the thin-piece is adapted to be once pushed in between said push-in area and said holding portion adjacent thereto to an extent sufficient for clearing the thin-piece from the holding portion on the opposite side of said aperture, whereby said thin-piece is movable back from said push-in area onto the seat where said abutting member abuts one edge of the thin-piece to keep the thin-piece in position.

7. A slide filing sheet as set forth in claim 6, wherein said base sheet is made of transparent material.

8. A slide filing sheet as set forth in claim 6, wherein said base sheet is made of translucent material, and each of said thin-piece seats has an opening formed at central portion thereof, said opening being so sized as to match a picture area of a photographic transparency held on said seat.

9. A slide filing sheet as set forth in claim 6, wherein said base sheet is made of opaque material, and each of said thin-piece seats has an opening formed at central portion thereof, said opening being so sized as to match a picture area of a photographic transparency held on said seat.

10. A slide filing sheet as set forth in claim 6, wherein said apertures have a generally rectangular shape and a holding portion is defined at each corner of said apertures.

11. A slide filing sheet as set forth in claim 6, wherein said apertures have a generally rectangular shape and a holding portion is defined on each side of said apertures.

* * * * *